(12) United States Patent
Papke

(10) Patent No.: US 7,829,610 B2
(45) Date of Patent: Nov. 9, 2010

(54) IMPACT-RESISTANT POLYOXYMETHYLENE MOLDING COMPOSITIONS, USE THEREOF AND MOLDINGS PRODUCED THEREFROM

(75) Inventor: Nicolai Papke, Mainz-Kastel (DE)

(73) Assignee: Ticona GmbH, Kelsterbach (DE)

( * ) Notice: Subject to any disclaimer, the term of this patent is extended or adjusted under 35 U.S.C. 154(b) by 638 days.

(21) Appl. No.: 11/837,924

(22) Filed: Aug. 13, 2007

(65) Prior Publication Data

US 2007/0276064 A1    Nov. 29, 2007

Related U.S. Application Data

(63) Continuation of application No. 10/524,329, filed as application No. PCT/EP03/09074 on Aug. 16, 2003, now abandoned.

(30) Foreign Application Priority Data

Aug. 19, 2002    (DE) .................. 102 37 884

(51) Int. Cl.
*C08L 59/02*    (2006.01)
(52) U.S. Cl. .......................... 523/201; 525/64; 525/69; 525/131; 525/164; 525/154; 525/399; 525/400
(58) Field of Classification Search ................. 523/201; 525/64, 69, 131, 154, 399, 400; 524/127, 524/156

See application file for complete search history.

(56) References Cited

U.S. PATENT DOCUMENTS

| | | | |
|---|---|---|---|
| 3,642,940 A | 2/1972 | Burg et al. |
| 3,749,755 A | 7/1973 | Bronstert et al. |
| 3,985,704 A | 10/1976 | Jones et al. |
| 4,230,838 A | 10/1980 | Foy et al. |
| 4,277,577 A | 7/1981 | Burg et al. |
| 4,332,920 A | 6/1982 | Foy et al. |
| 4,342,846 A | 8/1982 | Silberberg |
| 4,396,742 A | 8/1983 | Binsack et al. |
| 4,446,276 A | 5/1984 | Binsack et al. |
| 4,493,751 A | 1/1985 | Cherdron et al. |
| 5,039,741 A | 8/1991 | Burg et al. |
| 5,326,846 A | 7/1994 | Nagai et al. |
| 5,344,882 A | 9/1994 | Flexman |
| 6,399,699 B1 | 6/2002 | Tanigawa et al. |
| 2001/0049415 A1 | 12/2001 | Kim et al. |

FOREIGN PATENT DOCUMENTS

| | | |
|---|---|---|
| DE | 1 193 240 | 5/1965 |
| DE | 1 931 392 | 1/1971 |
| DE | 2 051 028 | 4/1971 |
| DE | 1 964 156 | 6/1971 |
| DE | 2 116 653 | 10/1971 |
| DE | 25 23 991 | 12/1975 |
| DE | 26 59 357 | 12/1975 |
| DE | 28 18 240 | 11/1979 |
| DE | 29 47 490 | 6/1981 |
| EP | 0 050 265 | 4/1982 |
| EP | 0 060 601 | 9/1982 |
| EP | 0 064 207 | 11/1982 |
| EP | 0 156 285 | 10/1985 |
| EP | 0 565 304 | 10/1993 |
| GB | 1 017 244 | 1/1966 |
| GB | 1 340 025 | 12/1973 |
| GB | 1 590 549 | 6/1981 |

OTHER PUBLICATIONS

"Lotader AX 8840" http://www.products.arkemagroup.com/literature/pdf/546.pdf.

*Primary Examiner*—Peter Szekely
(74) *Attorney, Agent, or Firm*—Dority & Manning, P.A.

(57) ABSTRACT

The present invention relates to a polyoxymethylene molding composition comprising:
(A) from 0.1 to 5.0% by weight of a compatibilizer,
(B) from 5 to 50% by weight of an impact modifier,
(C) the remainder to 100% by weight of a polyoxymethylene.

The molding compositions of the invention have substantially improved mechanical properties, in particular impact resistance.

17 Claims, No Drawings

IMPACT-RESISTANT POLYOXYMETHYLENE MOLDING COMPOSITIONS, USE THEREOF AND MOLDINGS PRODUCED THEREFROM

RELATED APPLICATIONS

This application is a continuation of U.S. patent application Ser. No. 10/524,329, filed Apr. 11, 2005, which is a national stage application (under 35 U.S.C. 371) of International Application No. PCT/EP2003/009074, filed Aug. 16, 2003, which claims benefit to German application number 102 378 84.3 filed Aug. 19, 2002.

The present invention relates to impact-modified polyoxymethylene molding compositions suitable for production of moldings or of extrudates. The products produced therewith have improved mechanical properties.

Since their introduction to the market, polyoxymethylenes have become established as extremely useful technical materials in many applications. Polyoxymethylene is particularly widely used as an engineering material in automotive construction, in the electrical industry, and in medical technology. In these applications, polyoxymethylene molding compositions are subject to a requirement for a certain level of mechanical properties, such as stiffness, hardness, and toughness, this level being an essential requirement for the use of these materials for technical components like gear wheels and levers, among many other examples. The published values for yield stress are from 60 to 70 N/mm$^2$. The values found for the tensile modulus of elasticity of unmodified copolymers are from 2400 to 3100 N/mm$^2$. The values found for tensile strain at break are from 10 to 30%.

However, the impact resistance of polyoxymethylenes is too low for many potential applications. Another desirable property in these applications is the capability of the products to retain their good impact resistance properties even at relatively low ambient temperatures.

It is known that polyoxymethylenes can be toughened by adding impact modifiers. Impact modifiers used comprise organic additives, such as crosslinked or non-crosslinked elastomers, or graft copolymers made from an elastomeric, single-phase core and from a hard outer graft layer. Impact-modified polyoxymethylene molding compositions are known from the patent literature, e.g. polyoxymethylene modified with polyurethanes (DE 1 193 240), polyoxymethylene modified with a 2-phase mixture made from polybutadiene and styrene-acrylonitrile (ABS) (DE 1 931 392), polyoxymethylene modified with a graft copolymer prepared from acrylate-butadiene (DE 1 964 156), a polyoxymethylene provided with modified polysiloxanes and, respectively, silicone rubbers (DE 2 659 357), and finally polyoxymethylene modified with a graft copolymer composed of an elastomeric, single-phase core based on polydiene and of a hard, single- or multiphase outer graft layer, e.g. made from poly(alkyl)acrylates, poly(alkyl)acrylonitriles or polystyrene (EP 0156285 B1).

However, the general increase in requirements placed upon materials often includes a further improvement in impact resistance and an improvement in mechanical properties.

The object of the present invention consists in providing polyoxymethylene molding compositions which have further improved impact resistance and mechanical properties. These molding compositions may be processed to give moldings with improved properties.

The object is achieved via a polyoxymethylene molding composition comprising:

(A) from 0.1 to 5.0% by weight of a compatibilizer, (B) from 5 to 50% by weight of an impact modifier, (C) the remainder to 100% by weight of a polyoxymethylene.

Surprisingly, it has been found that the inventive polyoxymethylene molding compositions have considerably better impact resistance than the prior art. In particular, the present invention gives a surprising improvement in low-temperature impact resistance.

The inventive molding composition comprises from 0.1 to 5.0% by weight, preferably from 0.2 to 2% by weight, particularly preferably from 0.3 to 1% by weight, in particular from 0.3 to 0.6% by weight, of a compatibilizer, component (A), which encompasses a plurality of units of the formula

(I)

(II)

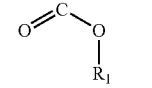

and, where appropriate,
(III)

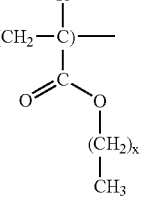

(IV)

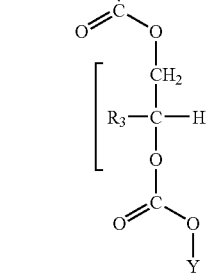
and/or

-continued

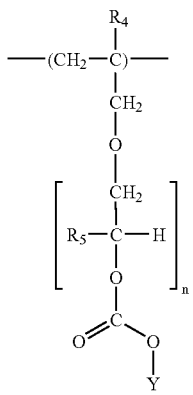
(V)

where R and R$_2$ are a hydrogen atom or an alkyl group having 1 or 2 carbon atoms,

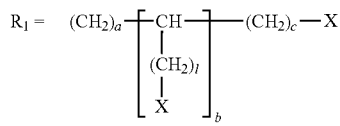

and where X is CH$_3$ or

and at least one X is

and where
a is a number from 1 to 10,
b is 0 or 1,
c is a number from 0 to 10,
l is a number from 0 to 10,
R$_3$, R$_5$ are a hydrogen atom or a methyl group,
R$_4$ is a hydrogen atom or an alkyl group having from 1 to 4 carbon atoms,
m is 1 or 2,
n is 0 or 1 or 2,
x is an integer from 0 to 10,
Y is H or

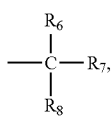

where
R$_6$, R$_7$ are identical or different and are an alkyl group having from 1 to 4 carbon atoms, R$_8$ is an alkyl group having from 1 to 12 carbon atoms, phenyl, alkylphenyl or cycloalkyl having from 3 to 12 carbon atoms

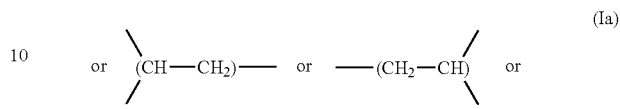
(Ia)

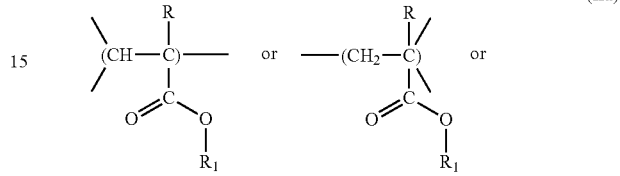
(IIa)

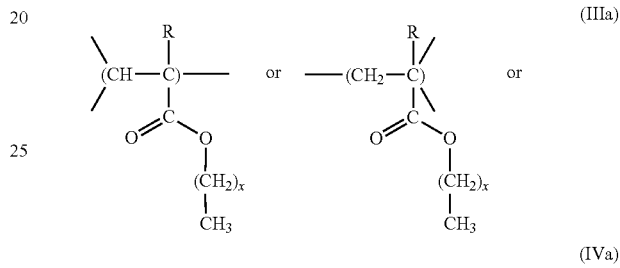
(IIIa)

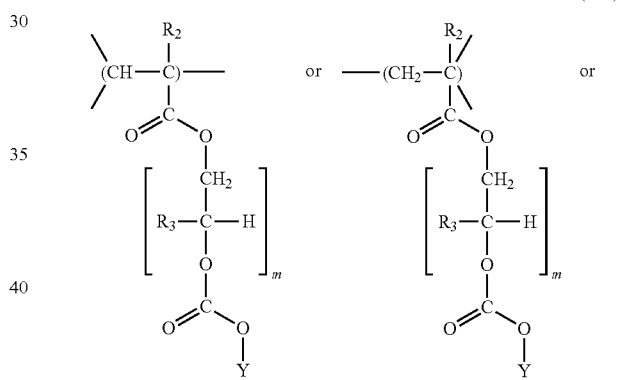
(IVa)

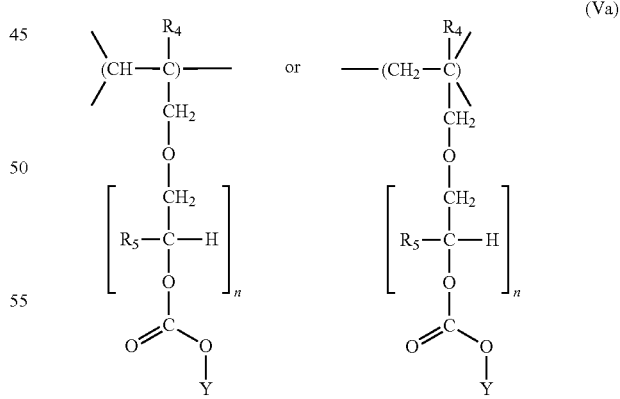
(Va)

where the units of the formulae (Ia), (Ia), (IIIa), (IVa) and (Va) may have bonding to of the formulae (I), (II), (III), (IV), or (V), and the compatibilizer comprises
from 29 to 70% by weight of units of the formula (I)
from 0.5 to 30% by weight of units of the formula (II)
from 10 to 70% by weight of units of the formula (III)

and from 0 to 10% by weight of units of the formula (IV) and/or (V).

The inventive compatibilizer usually has a molecular weight of from 5000 to $1 \cdot 10^8$, and preferably from $1 \cdot 10^4$ to $1 \cdot 10^6$. Glycidyl acrylate monomers of the formula

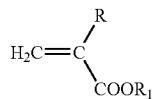 (VI)

may be mentioned as specific examples of precursors of the units of the formula (II), where R and $R_1$ are as defined above.

It is advantageous to use glycidyl methacrylate.

Acrylate monomers of the formula

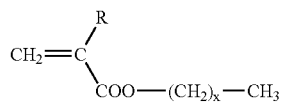 (VII)

may be mentioned as specific examples of precursors of units of the formula (III), where R and x are as defined above.

It is advantageous to use ethyl acrylate and methyl methacrylate.

Periodic units of the formulae

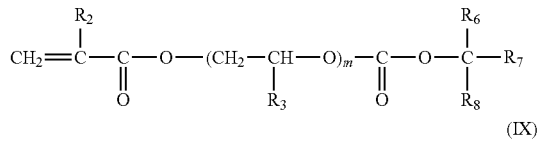 (VIII)

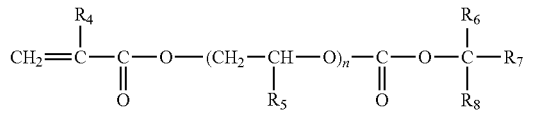 (IX)

may be mentioned as specific examples of precursors of the units of the formulae (IV) and (V), where $R_2$, $R_3$, $R_4$, $R_5$, $R_6$, $R_7$, $R_8$, m, and n are as defined above.

The inventive alloy-compatibilizer containing the units of the formula (I), (II), and (III) may in principle be obtained by the known high-pressure free-radical copolymerization process. The process consists in reacting the precursors of said units at a temperature of from 50 to 300° C. and at a pressure of from 500 to 3000 bar in the presence of initiators of organic peroxide type. The amount of the copolymerization initiators is from 0.0001 to 0.1% of the total weight of the starting monomers.

If the compatibilizer for the inventive alloy also contains units of the formula (IV) and/or (V), it is in principle obtained by the process which consists in:
a. preparing a copolymer which contains units of the formula (I) and (II) or (III) or a terpolymer which contains the units (I) and (II) and (III), by the known high-pressure free-radical polymerization process,
b. bringing the resultant polymer, in a reactor kept at a temperature of from 60 to 85° C., into contact for two or more hours with a solution, the contents of the solution being the monomer(s) of the formula (VI) and/or (VII), the monomer(s) of the formula (VIII) and/or (IX), a peroxide initiating the polymerization, and a chain transfer agent,
c. subjecting the resultant product, washed with water and then dried, to treatment in an extruder at about 200° C.

The component (B) used comprises from 5 to 50% by weight, preferably from 5 to 40% by weight, particularly preferably from 7 to 30% by weight, of an impact modifier. Impact modifiers which may used, individually or as a mixture, are polyurethanes, two-phase mixtures made from polybutadiene and styrene-acrylonitrile (ABS), modified polysiloxanes and, respectively, silicone rubbers, or graft copolymers made from an elastomeric, single-phase core based on polydiene and from a hard outer graft layer (core-shell structure). In the latter case, component (B) is composed of particles most of which, preferably more than 70% of which, have a structure of core and outer layers. The core here is formed from an elastomeric polymer phase onto which has been grafted the hard outer layer, which may also be composed of two or more layers. The core is preferably single-phase, meaning that the core is composed mainly, preferably completely, of the elastomeric soft phase and comprises only small amounts of, preferably no, inclusions made from hard polymer constituents of the outer layer. The graft copolymer is mostly composed of from 40 to 95% by weight, advantageously from 60 to 90% by weight, particularly advantageously from 70 to 80% by weight, of the elastomeric core. The proportion of the outer layer (shells) is from 5 to 60% by weight, advantageously from 10 to 40% by weight, particularly advantageously from 20 to 30% by weight. The core is generally composed of polydienes, e.g. polybutadiene or polyiosprene, and can contain up to 10% by weight, advantageously up to 5% by weight, of comonomer units. Styrene or acrylonitrile may advantageously be used as comonomer. The core polymer may also have been crosslinked and have a gel content, measured in toluene, generally greater than 70%, and preferably greater than 80%. An example of a crosslinker which may be used is divinylbenzene. The outer layer of the particles is composed of hard polymers which have been grafted onto the core as graft substrate. The outer layer here may have a single- or multishell structure, advantageously a dual-shell structure. If there is more than one outer layer, it is advantageous for the various layers to be composed of different polymers or copolymers. It is advantageous here for the first layer to have been crosslinked. However, where appropriate, the other layers may also have been crosslinked. Examples of suitable monomers which give suitable polymers for the outer layer of the particles are unsaturated nitriles, acrylates, methacrylates, vinyl esters, styrene derivatives, advantageous monomers being acrylonitrile, methacrylonitrile acrylates and methacrylates having an alcohol component which has from 1 to 6, preferably from 1 to 4, carbon atoms, examples being methyl acrylate, ethyl acrylate, propyl acrylate, n-butyl acrylate, methyl methacrylate, ethyl methacrylate, propyl methacrylate, butyl methacrylate, and tert-butyl methacrylate. Vinyl compounds which may also be used with advantage are vinyl acetate, vinyl ethers, N-vinyl-N-methylacetamide, and vinylpyrrolidone, and examples of styrene derivatives which may be used with advantage are styrene, α-methylstyrene and vinyltoluene. Copolymers made from at least two of the abovementioned monomer groups and monomers may also be used in the structure of the outer layer, in particular copolymers of the specified styrene derivatives with the other monomers. Particularly advantageous copolymers are those prepared from a mixture comprising from 20 to 80% by weight of acrylonitrile or methacrylonitrile with from 80 to 20% by weight of the other specified monomers, in particular acrylates, methacrylates and vinyl esters. Preference is also given to graft polymers which have a dual-shell outer layer structure, the first shell being composed of polystyrene and the second, outer, shell being composed of a poly(meth)acrylate, which has particularly preferably been crosslinked to some extent. The crosslinking monomers used may in principle comprise any of the compounds suitable for this purpose, for example multifunctional olefins, such as divinylbenzene, ethylene glycol dimethacrylate, butylene glycol dimethacrylate, or else triallyl cyanurate.

According to the invention, the glass transition temperature of the component (B) described above is from −40 to −120° C., preferably below −60° C., in particular from −80 to −120° C. The preparation of the graft copolymers which can be used as component (B) and have a core-shell structure is known and can use single-stage polymerization in the case of a single-shell outer layer or multistage polymerization in the case of a multishell outer layer, for example as described in the Patent Specification U.S. Pat. No. 3,985,704, which is incorporated herein by way of reference. The graft copolymerization is carried out using water-soluble initiators or using activated initiator systems of which one component at least is water-soluble, for example as described in C. B. Bucknall, "Toughened Plastics", p. 98, Applied Science Publishers Ltd. 1977 (London)). For the single- or multistage graft copolymerization the starting material is a polydiene, preferably in the form of an aqueous latex with defined average particle size, particularly preferably in the range from 0.1 to 5 μm, where the polydiene has particularly preferably been partially crosslinked.

For the preparation, the monomer or the monomer mixture is polymerized in the presence of the polydiene, whereupon the major portion of the monomers is grafted onto the polydiene particles. The amount of polydiene is generally from 40 to 95% by weight, and the amount of the monomer or monomer mixture is generally from 5 to 60% by weight, based in each case on the total amount. The graft yield achieved varies from 60 to 95%, preferably from 80 to 90%. The graft polymerization is carried out in solution or emulsion, preferably in aqueous dispersion. For this purpose, the fine-particle polydiene latex forms an initial charge with addition of the usual polymerization auxiliaries, such as emulsifying agents or suspending agents, free-radical initiators, regulators, etc., and the monomer or the monomer mixture is added and polymerized at temperatures from 30 to 95° C., preferably from 50 to 80° C. For a single-stage reaction the initiator is water-soluble, and examples of initiators which may be used are water-soluble peroxides, percarbonates or perborates. In the case of a multicomponent initiator system (redox system) at least one component has to be water-soluble. Examples of emulsifiers which may be used, and are also termed dispersing agents, are aliphatic and aromatic sulfates, sulfonates, and salts of carboxylic acids, for example dresinates. The compounds suitable for this purpose are well known to the skilled worker.

For a multistage reaction the graft polymerization and the work-up generally take place as described in U.S. Pat. No. 3,985,704. To form a multishell outer layer, a monomer or a monomer mixture, such as styrene, is first grafted onto the core polymer, such as butadiene-styrene copolymer, and then another monomer or monomer mixture is used, where appropriate in the presence of a crosslinker. The average particle size of the particles is advantageously from 0.1 to 5 μm.

Other materials which can be used as graft copolymers for component (B) are those in which the core is composed mainly or completely of, preferably partially crosslinked, polyacrylates or polymethacrylates, the alcohol component of which contains from 1 to 15 carbon atoms, preferably from 1 to 8 carbon atoms. Olefinic monomers may be used as comonomers, advantageously butadiene, cyclooctadiene, vinyl ethers and haloalkyl acrylates. The gel content, measured in toluene, is preferably at least 50%, particularly preferably at least 70%. For the outer graft layer use may be made of the monomers and monomer mixtures described above. The particle sizes, too, are in the same range. Graft polymers based on polyacrylates and on polymethacrylates are described by way of example in DE 1964156, DE 2116653, EP 50265, EP 60601 and EP 64207, incorporated herein by way of reference. The core of the graft polymer may also be composed entirely or partially of a silicone rubber and/or of non-crosslinked organopolysiloxanes. The other monomers and/or monomer mixtures described above may be grafted onto this core, which preferably contains functional groups having graft activity. These materials are described by way of example in DE 2659357, incorporated herein by way of reference. Component (B) preferably comprises a diluent, and in particular if the core of the graft polymer is composed of partially crosslinked polyacrylates or polymethacrylates. The diluent is a low-melting, advantageously polymeric substance which has good miscibility in the melt with the graft polymers used as impact modifier. It is particularly advantageous to use this diluent if the level of crosslinking of the graft polymers is sufficiently high to make them insoluble in the diluent, and a two-phase system forms, and the surface tension leads to fine distribution of the graft polymers in the diluent. The graft polymer is preferably present mainly in the peripheral region of the two-phase system. As the amount of graft polymer increases it is also increasingly present in the core, and, with a further increase in the amount of the graft polymer, also outside the two-phase system within the matrix polymer, component (C). It is particularly advantageous to have uniform distribution of the two-phase system and of the graft polymer in component (C), in particular if the graft polymer is mainly present at the periphery of the two-phase system. The melting point of the diluent should be below 250° C., preferably from 180 to 210° C. The amount of the diluent is from 10 to 95%, advantageously from 30 to 70%, particularly preferably from 40 to 60%, based on the entirety of graft polymer and diluent. Materials which may be used with very particular advantage as diluents are polyurethanes and segmented copolyesters and ethylene-vinylacetate copolymers. Other suitable diluents are known to the skilled worker and are described by way of example in DE 2818240 and DE 2523991, incorporated herein by way of reference. The diluent may advantageously be mixed with the graft polymer prior to addition to component (C).

Other impact-modifying components, component (B), which may be used are advantageously polyurethanes, preferably thermoplastic polyurethanes. The polyurethanes which may be used according to the invention are known products described by way of example in DE 1193240 and DE 2051028, and in Kunststoff-Taschenbuch, [Plastics Handbook] (Saechtling, 27th edition, Hanser Verlag 1998) on pages 523-542, incorporated herein by way of reference. They are prepared in a known manner via polyaddition, from polyisocyanates, in particular diisocyanates, polyesters, polyethers, polyesteramides, polyacetals or other suitable hydroxy or amino compounds, such as hydroxylated polybutadiene, or mixtures of the abovementioned compounds. Where appropriate, use is also made of chain extenders, such as low-molecular-weight polyols, in particular diols, polyamines, in particular diamines, or water.

Examples of suitable diisocyanates are diisocyanates of the formula (X)

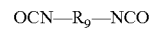
$$OCN-R_9-NCO \qquad (X)$$

where $R_9$ is a divalent, straight-chain or branched aliphatic radical having from 1 to 20, preferably from 2 to 12, carbon atoms, or a divalent cycloaliphatic radical having from 4 to 20, preferably from 6 to 15, carbon atoms, or a divalent, substituted or unsubstituted aromatic radical having from 6 to 25, preferably from 6 to 15, carbon atoms. If appropriate, the radical $R_9$ may also be an aromatic radical, examples being tolylene 2,4-diisocyanate, tolylene 2,6-diisocyanate, or mixtures of these, naphthylene 1,5-diisocyanate, diphenylmethane 4,4'-diisocyanates (MDI or PMDI), individually or in the form of a mixture.

An example of a divalent, aliphatic radical is the alkylidene radical —$(CH_2)_n$—, where n=2 to 12, e.g. ethylidene, propylidene, pentamethylene, or hexamethylene radical, or the like, or the 2-methylpentamethylene, 2,2,4-trimethylhexamethylene or 2,4,4-trimethylhexamethylene radical. Diisocyanates of this type which are particularly preferred are hexamethylene diisocyanate, and 2,2,4- and 2,4,4-trimethylhexamethylene diisocyanate.

If $R_9$ in formula I above is a cycloaliphatic radical, this is preferably the unsubstituted or substituted cyclohexane radical. Examples of diisocyanates of this type are 1,2- or 1,4-di(isocyanatomethyl)cyclohexane or isophorone diisocyanate.

$R_9$ in formula I above may also be a combination of divalent, open-chain aliphatic or cycloaliphatic radicals, for example

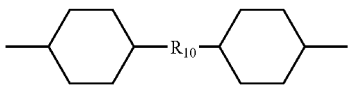

where $R_{10}$ is a saturated, straight-chain or branched aliphatic radical having from 1 to 8, preferably from 1 to 3, carbon atoms. The two rings here are preferably unsubstituted cyclohexane, while $R_{10}$ is preferably the methylene, ethylene, methylmethylene, or dimethylmethylene group.

If $R_9$ is an open-chain, divalent radical, it is preferably an unbranched alkylidene radical —$(CH_2)_n$—, where n=from 2 to 12. Examples of these are the ethylidene, propylidene, pentamethylene and hexamethylene radicals, and also the 2-methylpentamethylene, 2,2,4-trimethylhexamethylene or 2,4,4-trimethylhexamethylene radicals. Diisocyanates of this type which are particularly preferred are hexamethylene diisocyanate and also 2,2,4- and 2,4,4-trimethylhexamethylene diisocyanate.

If $R_9$ in formula (X) above is a divalent aromatic radical, it is preferably the toluene, diphenylmethane, phenylene or naphthalene radical. Examples of corresponding diisocyanates are toluene 2,4-diisocyanate, toluene 2,6-diisocyanate, diphenylmethane 4,4'-diisocyanate, 3,3'-dimethyl-diphenylmethane 4,4'-diisocyanate, 3,3'-dimethyldiphenylene 4,4'-diisocyanate(3,3'-bitoluene-4,4'-diisocyanate), m-phenylene diiso-cyanate, p-phenylene diisocyanate, o-phenylene diisocyanate, chlorophenylene 2,4-(toluene diisocyanate), 3,3'-dichlorodiphenyl 4,4'-diisocyanate 4-chlorophenylene 1,3-diisocyanate, naphthalene 1,5-diisocyanate, and naphthalene 1,4-diisocyanate.

If $R_9$ in formula (X) above is a cycloaliphatic radical, it is preferably the unsubstituted or substituted cyclohexane radical. Examples of diisocyanates of this type are 1,2- or 1,4-di(isocyanatomethyl)cyclohexane or isophorone diisocyanate.

The diisocyanates of formula (X) may also be used in oligomeric form, for example in dimeric or trimeric form. Instead of the polyisocyanates, use may also be made in a known manner of blocked polyisocyanates, these being obtained from the isocyanates mentioned by reaction with phenol or caprolactam, for example.

Aliphatic polyhydroxy compounds which may be used are polyethers, such as polyethylene glycol ethers, polypropylene glycol ethers, and polybutylene glycol ethers, poly-1,4-butanediol ethers or mixed polyethers made from ethylene oxide and propylene oxide, Other compounds which may be used for this purpose are polyesteramides, polyacetals, and preferably aliphatic polyesters, all of these compounds having free OH end groups.

The aliphatic polyesters preferably used are mainly non-crosslinked polyesters with molecular weights of from 500 to 10000, preferably from 500 to 5000. The acid components derive from unbranched and/or branched aliphatic dicarboxylic acids, e.g. dicarboxylic acids of the formula HOOC—$(CH_2)_p$—COOH, where p=from 0 to 20, preferably from 4 to 10, in particular adipic acid and sebacic acid. Use may also be made here of cycloaliphatic dicarboxylic acids, such as cyclohexanedicarboxylic acids, or of mixtures with the abovementioned aliphatic dicarboxylic acids.

The alcohol component used for these polyesters is in particular an unbranched or branched aliphatic primary diol, e.g. a diol of the formula HO—$(CH_2)_q$—OH, where q=from 2 to 12, preferably from 2 to 6. Mention may in particular be made here of 1,4-butanediol, 1,6-hexanediol and 2,2-dimethylpropanediol-1,3 and also diethylene glycol. Cycloaliphatic diols, such as bis-hydroxymethylcyclohexane, are also suitable here, as are mixtures with the aliphatic diols.

Each of the polyesters may be prepared from one dicarboxylic acid and one diol, or else, as mentioned, from a mixture of two or more dicarboxylic acids and/or two or more diols.

Chain extenders which may be used in preparing the polyurethanes are mainly low-molecular-weight polyols, in particular diols, or else polyamines, in particular diamines, or else water.

The polyurethanes used according to the invention are preferably thermoplastic and therefore preferably substantially non-crosslinked, i.e. capable of melting repeatedly without any significant signs of decomposition. Their reduced specific viscosities, measured at 30° C. in dimethylformamide, are generally from 0.5 to 3 dl/g, preferably from 1 to 2 dl/g. The values for the tensile strains at break are advantageously from 300 to 1500%, preferably from more than 400 to 1500%, while the Shore hardness A is not more than 100, advantageously not more than 85, preferably from 60 to 90, particularly preferably from 70 to 89, in particular from 75 to 85, and the glass transition temperatures are mostly not above 0° C., advantageously not above −10° C., particularly advantageously not above −20° C.

The base material used for the molding compositions of the invention, polyoxymethylenes (C), may be homopolyoxymethylenes or copolyoxymethylenes. Polymers of this type are known to the skilled worker and are described in the literature. The homopolymers are generally obtained by polymerizing formaldehyde or trioxane, and the polymerization here may be initiated cationically or anionically. However, preference is given to copolyoxymethylenes which contain not only oxymethylene units but also oxyalkylene units, where the alkylene groups may contain from 2 to 8 carbon units, linear or branched. The polyoxymethylenes (POMs) described by way of example in DIE-A 29 47 490 are generally unbranched linear polymers and generally contain at least 80%, preferably at least 90%, of oxymethylene units (—$CH_2O$—). The term polyoxymethylenes here encompasses homopolymers of formaldehyde or of its cyclic oligomers, such as trioxane or tetroxane, and also corresponding copolymers.

Homopolymers of formaldehyde or of trioxane are polymers of this type whose hydroxyl end groups have been chemically stabilized in a known manner to resist degradation, e.g. by esterification or etherification. Copolymers are polymers made from formaldehyde or from its cyclic oligomers, in particular trioxane, and from cyclic ethers, cyclic acetals, and/or linear polyacetals.

These homopolyoxymethylenes or copolyoxymethylenes are known per se to the skilled worker and are described in the literature. These polymers very generally have at least 50 mol % of —$CH_2O$— repeat units in the main polymer chain. The homopolymers are generally prepared by polymerizing formaldehyde or trioxane, preferably in the presence of suitable catalysts. Examples of particularly suitable catalysts are boron trifluoride and trifluoromethanesulfonic acid.

For the purposes of the invention, preference is given to copolyoxymethylenes as component (C), in particular those which also contain, alongside the —$CH_2O$— repeat units, up to 50 mol %, preferably from 0.1 to 20 mol %, and in particular from 0.5 to 10 mol %, of repeat units of the following formula

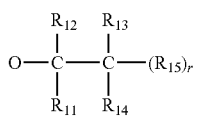

where $R_{11}$ to $R_{14}$ independently of one another, are a hydrogen atom, a $C_1$-$C_4$-alkyl group, or a halo-substituted alkyl group having from 1 to 4 carbon atoms, and $R_{15}$ is —$CH_2$—, —$CH_2O$—, or a $C_1$-$C_4$-alkyl- or $C_1$-$C_4$-haloalkyl-substituted methylene group, or a corresponding oxymethylene group, and n is from 0 to 3. These groups may advantageously be introduced into the copolymers by the ring-opening of cyclic ethers. Preferred cyclic ethers are those of the formula

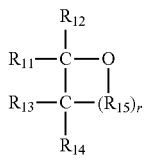

where $R_{11}$ to $R_{15}$ and r are as defined above. Cyclic ethers which may be mentioned as examples are ethylene oxide, propylene 1,2-oxide, butylene 1,2-oxide, butylene 1,3-oxide, 1,3-dioxane, 1,3-dioxolane and 1,3-dioxepan, and comonomers which may be mentioned as examples are linear oligo- or polyformals, such as polydioxoiane or polydioxepan.

Particularly advantageous copolymers are those made from 99.5-95 mol % of trioxane and 0.5-5 mol % of one of the above of the above-mentioned comonomers.

Also suitable as component (C) are oxymethyleneterpolymers, for example those prepared by reacting trioxane with one of the abovementioned cyclic ethers and with a third monomer, preferably a bifunctional compound of the formula

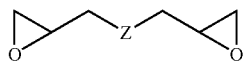

where Z is a chemical bond, —O—, or —ORO— (R=$C_1$-$C_8$-alkylene or $C_2$-$C_8$-cycloalkylene).

Preferred monomers of this type are ethylene diglycide, diglycidyl ether, and diethers made from glycidyl compounds and formaldehyde, dioxane or trioxane in a molar ratio of 2:1, and also diethers made from 2 mol of glycidyl compound and 1 mol of an aliphatic diol having from 2 to 8 carbon atoms, for example the diglycidyl ether of ethylene glycol, 1,4-butanediol, 1,3-butanediol, 1,3-cyclobutanediol, 1,2-propanediol or 1,4-cyclohexane-diol, to mention just a few examples.

Processes for preparing the above-described polyoxymethylene homo- and copolymers are known to the skilled worker and are described in the literature.

The preferred copolyoxymethylenes have melting points of 140° C. or above and molecular weights (weight average) $M_w$ in the range from 2000 to 1000000, preferably from 7000 to 150000. Particular preference is given to end-group-stabilized polyoxymethylenes whose chain ends have carbon-carbon bonds. The melt index (MVR 190/2.16) of the polyoxymethylenes used is generally from 0.3 to 100 $cm^3$/10 min (ISO 1133).

Particular preference is given to polyoxymethylenes substantially having oxymethylene units and oxyethylene units in the polymer chain. The proportion of the oxyethylene units, based on structural units in the polymer chain, is from 0.1 to 15 mol %, preferably from 0.2 to 10 mol %. The melt index MFI, measured to ISO 1133 at 190° C. with an applied weight of 2.16 kg is from 0.5 to 75 g/10 min, preferably from 2 to 60 g/10 min, and particularly preferably from 5 to 35 g/10 min. The number-average molar mass is at least 5000 g/mol and at most 100000 g/mol, determined by GPC in dimethylacetamide at from 150 to 160° C. It is also possible to use a mixture of different copolyoxymethylenes of differing compositions instead of a single copolyoxymethylene. Well known preparation processes can be used to prepare the copolyoxymethylenes. An example of a possible process is the copolymerization of trioxane with dioxolane in the presence of generally conventional amounts of $BF_3$ and methylal. Preference is given to polyoxymethylenes whose preparation uses trifluoromethanesulfonic acid or boron trifluoride as initiator.

The molding composition of the invention may comprise other conventional additives, individually or as a mixture, at up to 40% by weight, examples being carbon blacks, e.g. conductivity blacks, acid scavengers, antioxidants, UV stabilizers, coupling agents, mold-release aids, substances to improve electrical conductivity, antistats, nucleating agents, such as polyoxymethylene terpolymers or talc, colorants, such as inorganic pigments, e.g. titanium dioxide, ultramarine blue, cobalt blue, or organic pigments and colors, such as phthalocyanines, anthrachinones, fillers, such as glass beads, wollastonite, chalk, loam, molybdenum sulfide, or graphite, inorganic or organic fibers, such as glass fibers, carbon fibers or aramide fibers, lubricants, such as soaps and esters, stearyl stearate, montanic esters, partially hydrolyzed montanic esters, stearic acids, polar and/or non-polar polyethylene waxes, poly-α-olefin oligomers, silicone oils, polyalkylene glycols and perfluoroalkyl ethers, polytetrafluoroethylene, ultrahigh-molecular-weight polyethylene, paraffins, solid and liquid, stearic acids, and thermoplastic or thermoset polymer additives, elastomers, and other polymers, such as EPDM (ethylene-propylene-diene rubber), EPM (ethylene-propylene rubbers), polyester elastomers, copolymers of ethylene with (meth)acrylates and with (meth)acrylamides, polymethyl methacrylate, polyethylene, polystyrene.

Another additive which may be present is a cyclic stabilizer which contains at least one nitrogen atom in a ring. Examples of pyrrolidine, piperidine, pyrrole, pyridine, purine, indole, carbazole, tryptophan, oxazole, imidazole, thiazole, picoline, lutidine, collidine, quinoline, pyridazine, pyrimidine, pyrazine, and their derivatives. Advantageous compounds are heterocyclic compounds having at least one nitrogen atom as heteroatom which is either adjacent to an amino-substituted carbon atom or adjacent to a carbonyl group, examples being pyridazine, pyrimidine, pyrazine, pyrrolidone, aminopyridine, and compounds derived therefrom. Advantageous compounds of this general type are aminopyridine and compounds derived therefrom. In principle, all of the aminopyridines are suitable, examples being melamine, 2,6-diaminopyridine, substituted and dimeric aminopyridines, and also pyrrolidone and compounds derived therefrom, and mixtures prepared from these compounds. Examples of suitable pyrrolidones are imidazolidinone and compounds derived therefrom, e.g. hydantoin, the derivatives of which are particularly advantageous, and particularly advantageous compounds among these are allantoin and its derivatives. Other particularly advantageous compounds are triamino-1, 3,5-triazine (melamine) and its derivatives, e.g. melamine-formaldehyde condensates and methylolmelamine. Very particular preference is given to melamine, methylolmelamine, melamine-formaldehyde condensates, and allantoin. The cyclic stabilizers which contain at least one nitrogen atom in the ring may be used individually or in combinations.

Use may also advantageously be made of from 0.001-0.5% by weight of a metal salt of a carboxylic acid. Advantageous compounds are salts of fatty acids, in particular salts of higher fatty acids having from 10 to 32 carbon atoms, preferably from 14 to 32 carbon atoms, and particular preference is given to salts of montanic acids and stearic acid. Preferred metals are those which occur in the form of mono- or divalent ions, e.g. alkali metals and alkaline earth metals, in particular alkaline earth metals. Magnesium and calcium are particularly preferred, an example being calcium stearate. Magnesium stearate is very particularly preferred.

Other compounds which may be used advantageously are sterically hindered phenol compounds, the amounts of these which may be used being from 0.0 to 2% by weight, preferably from 0.1 to 1.0% by weight, particularly preferably from 0.2 to 1.0% by weight. Examples of these compounds are pentaerythrityl tetrakis[3-(3,5-di-tert-butyl-4-hydroxy-phenyl)propionate] (Irganox 1010, Ciba Specialty Chemicals), triethylene glycol bis[3-(3-tert-butyl-4-hydroxy-5-methylphenyl) propionate] (Irganox 245, Ciba Specialty Chemicals), 3,3'-bis[3-(3,5-di-tert-butyl-4-hydroxy-phenyl)propionohydrazide] (Irganox MD 1024, Ciba Specialty Chemicals), hexamethylene glycol bis[3-(3,5-di-tert-butyl-4-hydroxyphenyl)propionate] (Irganox 259, Ciba Specialty Chemicals), 3,5-di-tert-butyl-4-hydroxytoluene (Lowinox BHT, Great Lakes). Preference is given to Irganox 1010 and especially Irganox 245.

A stabilizer from the group of the benzotriazole derivatives or benzo-phenone derivatives or aromatic benzoate derivatives may also be present, its amount being from 0.0-1.0% by weight, preferably from 0.0-0.8% by weight. Preference is given to 2-[2'-hydroxy-3',5'-bis(1,1-dimethylbenzyl)-phenyl]benzotriazole, which is commercially available as Tinuvin 234 (Ciba Specialty Chemicals).

Another additive which may be used advantageously in the inventive molding composition is from 0.01-0.8% by weight, preferably from 0.01-0.5% by weight, very particularly preferably 0.4% by weight, of a sterically hindered amine as light stabilizer (HALS). Preference is given to 2,2,6,6-tetramethyl-4-piperidiyl compounds, e.g. bis(2,2,6,6-tetramethyl-4-piperidyl) sebacate (Tinuvin 770, Ciba Specialty Chemicals) or the polymer composed of dimethyl succinate and 1-(2-hydroxyethyl)-4-hydroxy-2,2,6,6-tetramethyl-4-piperidine (Tinuvin 622, Ciba Specialty Chemicals).

The polyoxymethylene molding compositions of the invention may be prepared using the conventional and known mixing methods, such as pelletizing, extrusion, kneading, etc. The molding compositions of the invention are preferably prepared by mixing polyoxymethylene polymer with additives and stabilizers and then pelletizing the mixture.

The polyoxymethylene molding compositions of the invention have substantially improved mechanical properties and low formaldehyde emission. The reduction in the amount of formaldehyde released can be observed even during preparation of the molding composition, e.g. during pelletizing, and also during processing. The polyoxymethylene molding composition of the invention therefore contributes to health and safety at work.

The mechanical properties of the inventive molding compositions exceed most of the usual requirements placed upon polyoxymethylene products, thus permitting unrestricted utilization of the processing techniques and application sectors usual for polyoxymethylene. There is a substantial improvement in impact resistance. The invention in particular gives a surprising improvement in low-temperature impact resistance.

Particular application sectors for the molding compositions of the invention are internal fittings and cladding for means of transport, such as automobiles, aircraft, etc. Other application sectors being household goods, toys, baby items, and also devices and components for electronics and for electrical engineering. The molding compositions of the invention are particularly suitable for producing apparatus and instruments, or parts thereof, for medical applications. The molding compositions prepared according to the invention have the lowest formaldehyde emission of any currently commercially available products, have defect-free surfaces, and have high colorfastness when the moldings are exposed for a long time to light or heat.

All of the references mentioned in this patent application are expressly incorporated herein by way of reference. Those references are therefore part of the disclosure of this patent application.

EXAMPLES

The examples below are intended to illustrate the invention for the person skilled in the art and to disclose further advantageous embodiments, but without restricting the scope of protection.

The base material used comprised Hostaform C 9021 polyoxymethylene copolymer from Ticona. Other auxiliaries used comprised 0.4% by weight of a mixture comprising wax and antioxidants.

Experiment 1 is a comparative example. Experiments 2 to 4 are the examples according to the invention. Experiment 1 used no adhesion promoter. Experiments 2 and 3 used an ethylene-glycidyl methacrylate-methyl acrylate terpolymer (E-GMA-MA, Lotader AX 8900, Atofina). Experiment 4 used an ethylene-glycidyl methacrylate copolymer (E-GMA, Lotader AX 8840, Atofina). The amounts stated in the table are in % by weight, tensile strength and tensile modulus of elasticity are in MPa, tensile strain at break is in %, impact resistance is in kJ/m$^2$, and fracture energy is in J.

The constituents were mixed and then extruded (ZSK 25MC twin-screw extruder from Werner & Pfleiderer, Germany) at 190° C. barrel temperature, and pelletized.

Test specimen production: The polyacetal granulates were injection molded to give standard test specimens and characterized in accordance with the methods listed below: tensile strength, tensile strain at break, tensile modulus of elasticity were determined in the tensile test to ISO 527. Charpy impact resistance was determined to ISO 179-1/eU for test specimens without notch and to ISO 176-1/eA for notched test specimens, in the tensile impact strength test. The fracture energies were determined on plaques (80×80×2 mm) to ISO 6603 (part 2).

Table 1 contains the formulations of the molding compositions and the corresponding test results.

Use of the reactive adhesion promoters improved mechanical impact properties, such as Charpy notched impact strength and, even more significantly, fracture energy in the automated penetration test (biaxial impact), in particular even at low temperatures (−30° C.). An additional feature of the molding compositions prepared was that there was only a minimal reduction in static mechanical properties (tensile strength, modulus). There is likewise an improvement in the ductilities (tensile strain at break) achievable.

TABLE 1

| Constituent/properties | Unit | 1 | 2 | 3 | 4 |
|---|---|---|---|---|---|
| Polyoxymethylene copolymer | % by wt. | 89.5500 | 89.5500 | 89.5500 | 89.5500 |
| Additives | % by wt. | 0.45 | 0.45 | 0.45 | 0.45 |
| TPU | % by wt. | 10 | 9.5 | 9 | 9.5 |
| E-GMA copolymer | % by wt. | | | | 0.5 |
| E-GMA-MA terpolymer | % by wt. | | 0.5 | 1 | |
| MVR 190/2.16 | ml/10 min | 7.2 | 7.3 | 7.4 | 7.3 |
| Tensile modulus of elasticity | MPa | 2272 | 2135 | 2103 | 2094 |
| Tensile strength | MPa | 55 | 53 | 52 | 52 |
| Tensile strain at break | % | 36 | 41 | 40 | 38 |
| Notched impact strength (Charpy, 23° C.) | kJ/m$^2$ | 12.8 | 15.5 | 15.3 | 14.4 |
| Fracture energy WS (2 mm, 23° C.) | J | 9.0 | 14.4 | 10.7 | 10.7 |
| Fracture energy WS (2 mm, −30° C.) | J | 3.9 | 5.2 | 4.2 | 5.5 |

The invention claimed is:

1. A polyoxymethylene molding composition comprising
(A) from 0.1 to 5.0% by weight of a compatibilizer containing underlying units of the following formula:

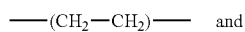 (I)

and

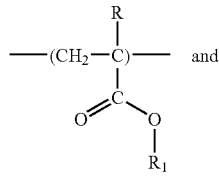 (II)

and

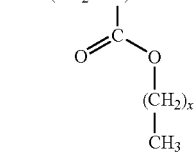 (III)

and,

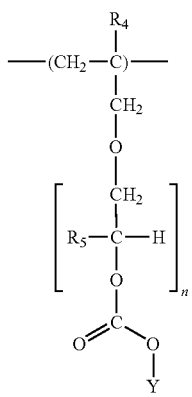 (IV)

-continued

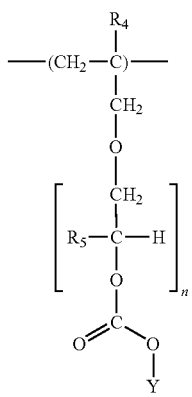 (V)

where R and $R_2$ are a hydrogen atom or an alkyl group having 1 or 2 carbon atoms, $$R_1 = (CH_2)_a \left[ \begin{array}{c} CH \\ | \\ (CH_2)_l \\ | \\ X \end{array} \right]_b (CH_2)_c - X$$

and where X is $CH_3$ or

and at least one X is

and where
a is a number from 1 to 10,
b is 0 or 1, c is a number from 0 to 10, l is a number from 0 to 10, $R_3$ and $R_5$ are hydrogen atom or a methyl group, $R_4$ is a hydrogen atom or an alkyl group having from 1 to 4 carbon atoms, m is 1 or 2, n is 0 or 1 or 2, x is an integer from 0 to 10, Y is H or

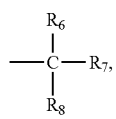

where $R_6$ and $R_7$ are identical or different and are an alkyl group having from 1 to 4 carbon atoms, $R_8$ is an alkyl group having from 1 to 12 carbon atoms, phenyl, alkylphenyl or cycloalkyl having from 3 to 12 carbon atoms

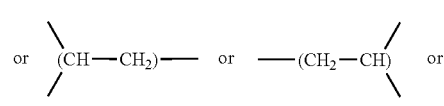
(Ia)

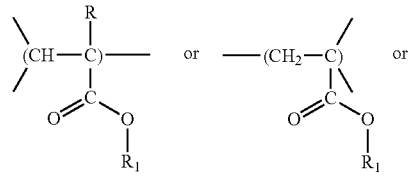
(IIa)

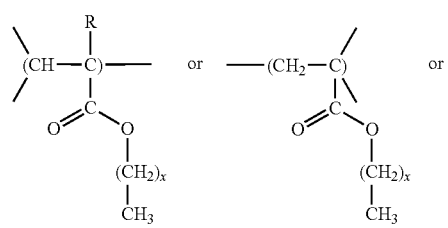
(IIIa)

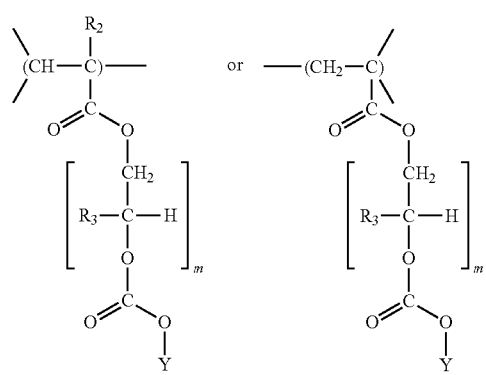
(IVa)

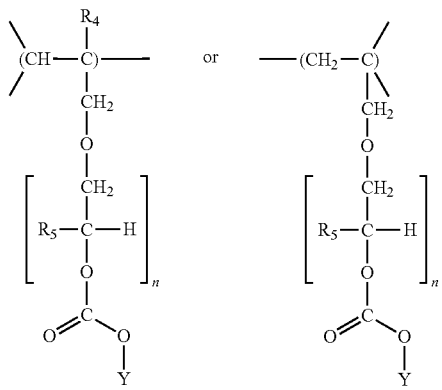
(Va)

where the underlying units of the formula (Ia), (IIa), (IIIa), (IVa) and (Va) may have bonding to underlying units of the formula (I), (II), (III), (IV), or (V), and the compatibilizer comprises
- from 29 to 70% by weight of underlying unit of the formula (I)
- from 0.5 to 30% by weight of underlying unit of the formula (II)
- from 10 to 70% by weight of underlying unit of formula (III)
- and from up to 10% by weight of underlying units of the formula (IV) and/or (V), (B) from 5 to 50% by weight of an impact modifier, (C) from 0 to 40% of conventional additives selected from the group consisting of carbon blacks, acid scavengers, antioxidants, stabilizers, UV stabilizers, coupling agents, mold-release aids, substances to improve electrical conductivity, antistats, nucleating agents, colorants, fillers, lubricants, waxes, oils, and combinations thereof, (D) the remainder to 100% by weight of a polyoxymethylene.

2. The polyoxymethylene molding composition as claimed in claim 1, wherein component (B) comprises a polyurethane, a two-phase mixture made from polybutadiene and styrene-acrylonitrile (ABS), modified polysiloxanes, silicone rubbers, of graft copolymers in a core-shell structure comprising an elastomeric, single-phase core based on polydiene, or mixtures thereof.

3. The polyoxymethylene molding composition as claimed in claim 1, wherein component (B) comprises graft polymers made from an elastomeric, single-phase core based on polydiene and an outer graft layer forming a core-shell structure, the outer layer of the particles having one or two subshells, where, in the case of particles having one subshell, the shell is composed of poly(meth)acrylate and poly(meth)acrylonitrile, and, in the case of particles having two such shells, the inner subshell is composed of crosslinked polystyrene and the outer subshell is composed of crosslinked polymethacrylate.

4. The polyoxymethylene molding composition as claimed in claim 1, wherein component (D), the polyoxymethylene, has been prepared using trifluoromethanesulfonic acid or boron trifluoride as initiator.

5. A molding produced from a thermoplastic molding composition as claimed in claim 1.

6. The polyoxymethylene molding composition as claimed in claim 1, wherein said compatibilizer comprises underlying units of the formula (I), (II), (III), and (IV).

7. The polyoxymethylene molding composition as claimed in claim 1, wherein said compatibilizer comprises underlying units of the formula (I), (II), (III), and (V).

8. The polyoxymethylene molding composition as claimed in claim 1, wherein said compatibilizer comprises underlying units of the formula (I), (II), (III), (IV) and (V).

9. The polyoxymethylene molding composition as claimed in claim 1, which comprises
 (A) from 0.2 to 2% by weight of a compatibilizer,
 (B) from 5 to 40% by weight of an impact modifier,
 (C) the remainder to 100% by weight of a polyoxymethylene.

10. The polyoxymethylene molding composition as claimed in claim 1, which comprises
 (A) from 0.3 to 0.6% by weight of a compatibilizer,
 (B) from 7 to 30% by weight of an impact modifier,
 (C) the remainder to 100% by weight of a polyoxymethylene.

11. The polyoxymethylene molding composition as claimed in claim 6, which comprises
 (A) from 0.3 to 0.6% by weight of a compatibilizer,
 (B) from 7 to 30% by weight of an impact modifier,
 (C) the remainder to 100% by weight of a polyoxymethylene.

12. The polyoxymethylene molding composition as claimed in claim 7, which comprises
 (A) from 0.3 to 0.6% by weight of a compatibilizer,
 (B) from 7 to 30% by weight of an impact modifier,
 (C) the remainder to 100% by weight of a polyoxymethylene.

13. The polyoxymethylene molding composition as claimed in claim 8, which comprises
 (A) from 0.3 to 0.6% by weight of a compatibilizer,
 (B) from 7 to 30% by weight of an impact modifier,
 (C) the remainder to 100% by weight of a polyoxymethylene.

14. The polyoxymethylene molding composition as claimed in claim 1, which comprises from 0.2 to 2% by weight of the compatibilizer.

15. The polyoxymethylene molding composition as claimed in claim 1, which comprises from 0.3 to 0.6% by weight of the compatibilizer.

16. The polyoxymethylene molding composition as claimed in claim 1, which comprises from 5 to 40% by weight of the impact modifier.

17. The polyoxymethylene molding composition as claimed in claim 1, which comprises from 7 to 30% by weight of the impact modifier.

* * * * *